Jan. 4, 1966     D. C. CHANEY ETAL     3,227,097
TROLLEY CONVEYOR
Filed Jan. 31, 1964     2 Sheets-Sheet 1
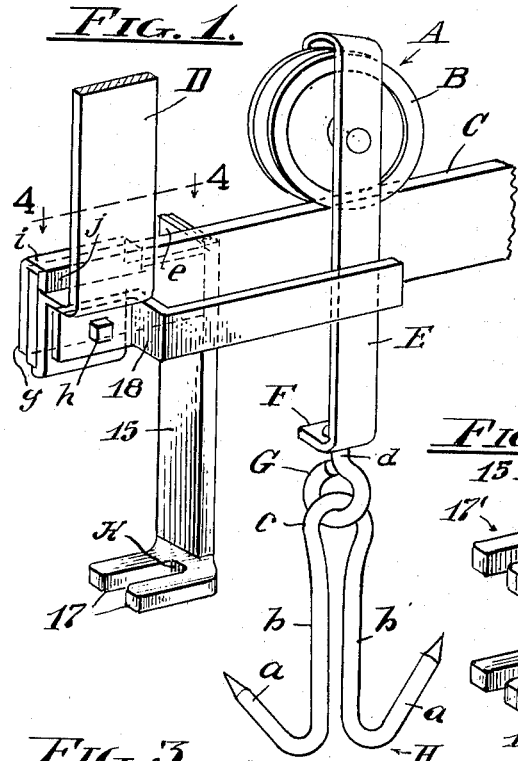
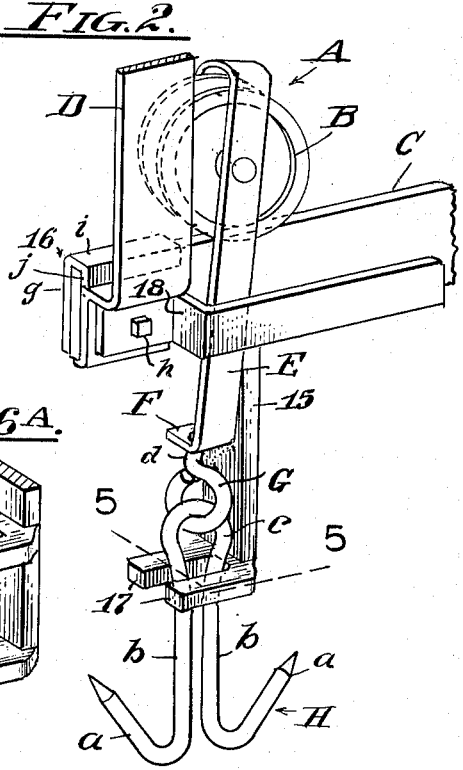
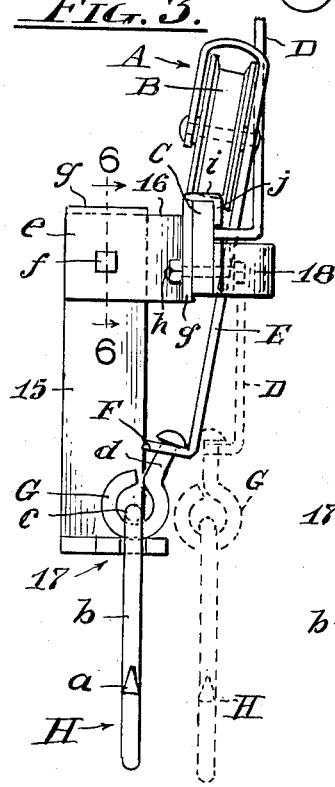
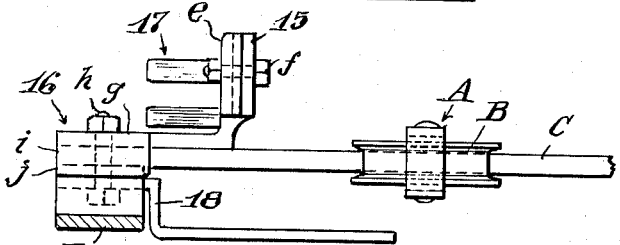
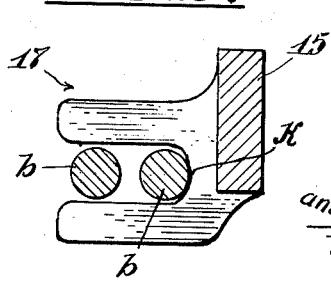
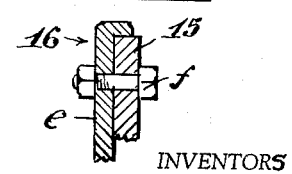
INVENTORS
Donald C. Chaney
and Warren W. Smith
By R. S. Berry
ATTORNEY

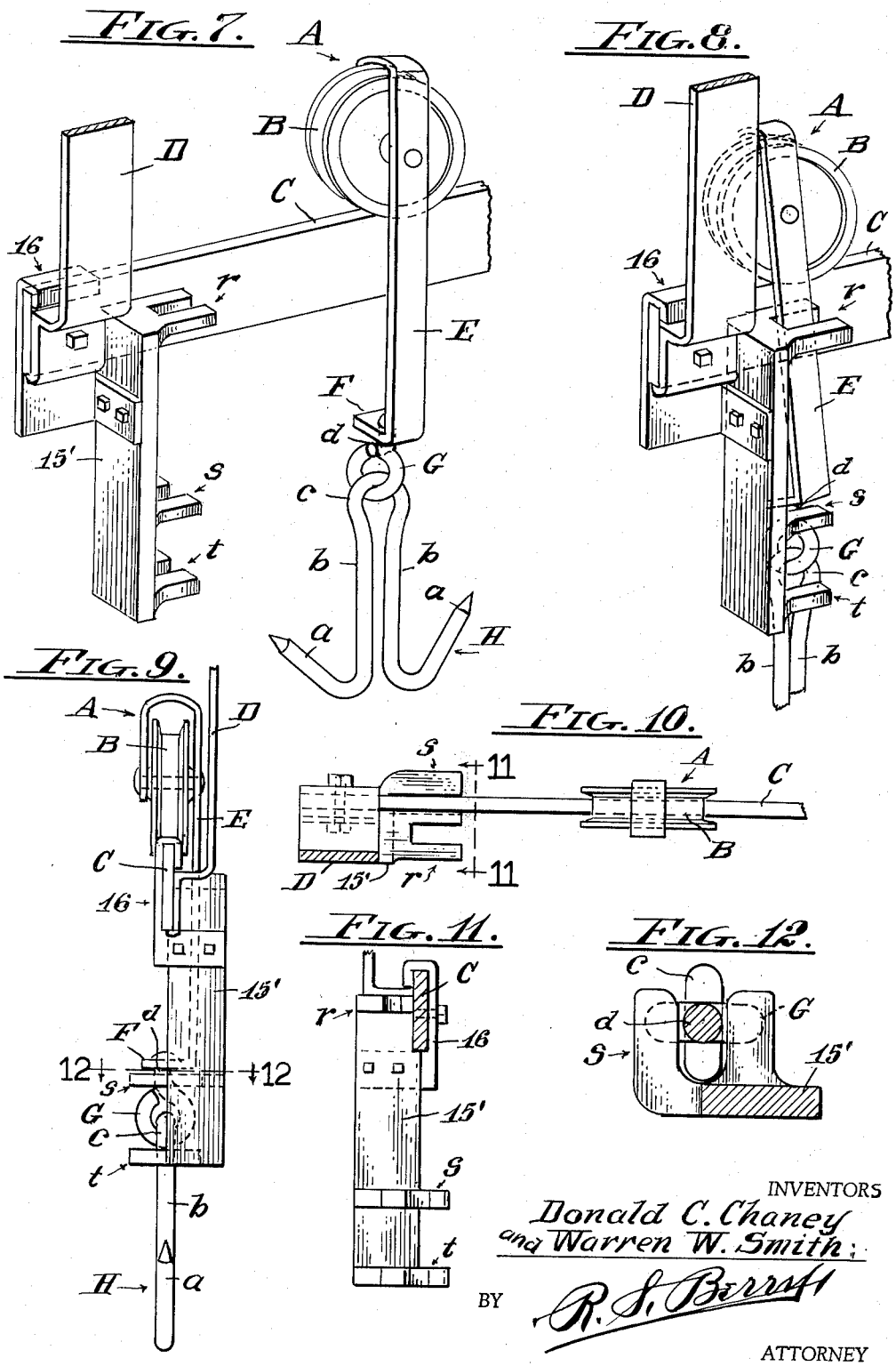

United States Patent Office 3,227,097
Patented Jan. 4, 1966

3,227,097
TROLLEY CONVEYOR
Donald C. Chaney, 5446 Thornburn Ave., and Warren W. Smith, 6061/4 N. Sycamore, both of Los Angeles, Calif.
Filed Jan. 31, 1964, Ser. No. 341,686
8 Claims. (Cl. 104—89)

This invention relates to a trolley conveyor of the type wherein a grooved wheel mounted on an overhead track has a swiveled hook suspended therefrom for attachment to an object to be transported along the track.

Such trolley conveyors are commonly employed in meat markets for transporting animal carcasses in whole or in part, to and from refrigerating compartments; the trolley being unusually manually loaded from trucks making deliveries to the market from warehouses.

This operation involves lifting the dressed body of a butchered animal or a portion thereof and engaging it with the suspended hook on the overhead trolley. In order to effect this operation with a minimum of difficulty it is necessary to hold the trolley and the hook thereon against movement under the thrust imposed thereagainst when the body is brought against the hook since the hook is free to swing on its mounting.

Holding of the hook and trolley is ordinarily accomplished manually so that loading the trolley usually requires the services of two persons, one to hold the hook against swinging and the other to lift and apply the carcass to the hook, so that when a person is not available to hold the hook, considerable inconvenience and loss of time is encountered in engaging the hook with the carcass.

The primary object of the invention is to provide a holder for releasably engaging and temporarily fastening a trolley conveyor and hook against movement while applying a carcass or portion thereto to the hook and when detaching it therefrom.

Another object is to provide a holder for accomplishing the above purpose which can be readily applied to the conventional overhead trolley track.

Another object is to provide a device for the purpose specified embodying few parts, which is simple in construction, has no working or moveable parts and is not liable to get out of order.

The invention is illustrated by way of example in the accompanying drawings, in which:

FIG. 1 is an isometric view of the holder showing it as applied to an overhead trolley track in readiness for use;

FIG. 2 is a view similar to FIG. 1 showing the holder in use an serving to hold the trolley and hook during the loading operation;

FIG. 3 is a view in end elevation of the applied holder shown in FIG. 2;

FIG. 4 is a plan view of the structure shown in FIG. 1;

FIG. 5 is a detail in horizontal section and plan as seen on the line 5—5 of FIG. 2 showing the manner in which the shank of a hook is engaged and held against movement during loading thereof;

FIG. 6 is a detail in section as seen on the line 6—6 of FIG. 3;

FIG. 6ᴬ is an isometric view of a fragmentary portion of the hook holder showing a modification thereof;

FIG. 7 is an isometric view showing a modified form of the invention as applied to a structure for holding the trolley and hook during unloading thereof and as disposed in readiness for use;

FIG. 8 is a view similar to FIG. 7 showing the holder in use;

FIG. 9 is a view in end elevation of the structure shown in FIG. 8;

FIG. 10 is a plan view of the structure shown in FIG. 7;

FIG. 11 is a view in section and elevation taken on the line 11—11 of FIG. 10 as seen in the direction of the arrows; and FIG. 12 is a cross section and plan as seen on the line 12—12 of FIG. 9.

Referring to the drawings more specifically A indicates generally a conventional trolley conveyor embodying a grooved wheel B mounted on an overhead horizontal rail C carried on a series of hangers, only an end hanger D of which is here shown.

Mounted on the wheel B and depending therefrom is a hanger E having an inturned flange F on its lower end on which is swivelled an eye G disposed beneath the flange. A load receiving hook H is mounted on the eye G and suspended therefrom for free swinging movement relative thereto. The hook H is here shown as comprising a pair of spurs a—a on shanks b—b joined by a loop c extending through the eye G and seated thereon with the shanks b—b depending from the loop. However the hook H sometimes comprises a single spur and stem in a well known manner. The eye G is provided with a headed stem d which is loosely passed through an aperture in the flange F whereby the stem may be both rotated and oscillated relative to the flange.

The trolley conveyor A is removably mounted on the rail C by merely seating the roller B on the rail C with the hanger E and hook assemblage depending therefrom as shown in FIG. 1. The trolley A when thus mounted on the rail C is free for rolling movement longitudinally of the rail and for limited rocking movement laterally of the rail and manifestly may be elevated relative to the rail to disengage the roller B from the rail. The end hanger D is attached to the side of the rail C over which the hanger E extends and thus limits the travel of the trolley in one direction. The hangers supporting the intermediate portion of the rail, not shown, are attached to the other side of the rail out of the path of travel of the trolley.

The present invention resides in an attachment adapted to be mounted on the rail C and to be engaged with the trolley conveyor A in such manner as to anchor the trolley and the hook H thereon while loading and unloading the trolley.

Generally considered, the attachment embodies a bracket comprising an elongate substantially rectangular rigid plate 15 together with means for securely and immovably mounting the plate 15 on the rail C. The plate is here shown as attached to the rail with its transverse width projecting perpendicularly relative to the rail and with a major portion of its length projecting downwardly relative to the lower edge of the rail. The means for thus mounting the plate 15 comprises an angle bracket 16 one leaf e of which seats against a flat face of the plate 15 and is secured thereto by a bolt f the other leaf g of the bracket abutting one side of the rail C and being secured thereto by bolt h. As a further means of securing the bracket 16 to the rail C the leaf g thereof is formed with a marginal flange i arranged to seat on the upper margin of the rail C; the flange i having a downturned lip j arranged to overlie and abut the side of the rail C opposite the side thereof abutted by the leaf g. The plate 15 may be thus mounted on the rail C at any desired point along the length thereof.

When the invention is to be utilized as a holder for the trolley A and the hook H during a loading operation, the lower end of the plate 15 is provided with a fork comprising a pair of spaced projections 17 which project outwardly from the side face of the plate 15 in the direction of the length of the rail C and opening away from said hook and shank as particularly shown in FIG. 1, which projections are designed to receive therebetween the shank or shanks of the hook H as will presently be described. In some instances the plate 15 may be provided with two spaced apart pairs of the projections 17 and 17' as shown in FIG. 6A.

The pair of projections are spaced apart such distance as to freely receive the shank b therebetween and to extend astride the shank contiguous opposed sides thereof to hold the hook against lateral swinging movement. A wall k extends between the inner ends of projections against which a shank interposed between the projections seats; the wall k acting as an abutment to hold the hook against swinging under thrusts imposed thereon when loading the hook.

In this application of the invention abutment means is provided for limiting movement of the trolley A longitudinally of the rail C to a position adjacent the depending plate 15 which means is here shown as comprising an L-shaped bracket 18 projecting laterally of the rail C into the path of travel of the hanger E. The bracket 18 is secured to the rail by a bolt h and may be attached to the rail at any desired point along its length. However since there is a relation between the bracket 18 and the plate 15, as will be later described, the bracket must necessarily be mounted on the rail C with its laterally projecting abutment forming portion 18 projecting from the rail C contiguous to but spaced from the side of the plate 15 from which the projections 17 extend; this spacing of the bracket portion 18 and the plate 15 exceeding but proximate the width of the hanger E.

In the operation of the invention to effect holding of the trolley A and the hook H against movement while loading the latter, the trolley is advanced on the rail C to a position in which the hanger E will be disposed beyond the outer face of the plate 15 to a position between the plate 15 and the laterally projecting portion of the bracket 18, adjacent such portion of the latter whereupon the hook H is swung upwardly on the eye G toward the outer end of the rail C. The lower end of hanger E is then swung inwardly to overlap the projections 17 followed by swinging the hook H downwardly to dispose the shank b thereof between the projections 17 as shown in FIGS. 2 and 5. The trolley will then be held against movement in either direction longitudinally of the rail C while the hook H will be held against lateral and rearward swinging movement. The laterally projecting member of the bracket 18 and the plate 15 are mounted on opposite sides of rail C and project substantially in planes at right angles to the rail, whereby, with the hanger E disposed on the side of the rail from which the bracket projects and with the projections 17 on the plate 15 offset on the side of the rail opposite the hanger E, as shown in FIG. 4, lateral swinging of the hanger E to position the hook H in overlapping relation to the projections 17 will dispose the hanger at an inclination with one margin of its lower end portion adjacent the plate 15 and with an intermediate portion of the other margin of the hanger overlying the bracket member 18 contiguous thereto, which inclined position of the hanger will be retained when the hook is engaged by the projection 17 as shown in FIGS. 2 and 3.

One of the hooks H, where a pair of hooks is employed, will be presented forwardly of the plate 15 in a position to receive the load to be impaled on the forwardly presented spur a.

The loaded trolley A may then be rolled along the rail to a desired location, whereupon another trolley conveyor may be set in place on the rail and positioned to receive a load as above described.

When the invention is to be employed to effect holding of the trolley and the hook during an unloading operation the arrangement shown in FIGS. 7 to 12 is employed.

In this instance the plate 15' is suspended from the rail C to extend therefrom in front of the hanger E of the trolley and mounted on the face of the plate presented to the hanger E is a series of three pairs of projections or forks r, s and t of which the fork r is located at or adjacent the upper end of the plate 15 for positioning astride the hanger E, the fork s is projected from the plate 15' in a position to extend astride the stem d of the eye G while the lowermost fork t is positioned to extend astride the shank or shanks of the hooks H.

In the operation of this form of the invention the trolley A is advanced on the rail C to position the hanger E in engagement with the fork r and to dispose the intermediate fork s astride the stem d of the eye G, and at the same time position the shank b of the hook H between the prongs of the lower fork t.

The trolley will then be securely held against vertical displacement such as could otherwise be occasioned in lifting a load to free it from engagement with the hook.

The structure of the invention is subject to modifications and accordingly the invention embodies any variations in the parts and in the combination, construction and arrangement of parts as come within the meaning and scope of the appended claims.

We claim:

1. The combination with a trolley conveyor embodying a grooved wheel, an overhead rail on which the wheel is revolubly supported, a hanger mounted on said wheel, and a load engaging hook having a shank loosely suspended from said hanger; of a pair of spaced parallel projections for detachably engaging said shank, and means for rigidly suspending said projections from said rail in a position to be engaged by said shank, said projections being spaced apart such distance as to freely receive said shank therebetween and to extend astride the shank contiguous opposed sides thereof, there being a wall extending between the inner ends of said projections against which the shank interposed between the projections abuts; said shank engaging projections opening away from said hook and shank in the direction of the length of said rail.

2. The combination called for in claim 1 in which said means comprises a rigid plate on which said projections and wall are carried, and in which said projections are offset laterally relative to said suspended hook, and means for fixedly attaching said plate to said rail in dependent relation thereto.

3. The combination called for in claim 2 in which said last named means comprises an angle bracket embodying a pair of leaves having one leaf thereof rigidly attached to said plate and having its other leaf rigidly attached to said rail.

4. The combination called for in claim 2 together with abutment means for limiting movement of said trolley longitudinally of said rail in one direction arranged to be abutted by said hanger, said abutment means and plate being mounted on opposite sides of the rail relative to each other with the plate spaced from the abutment means longitudinally of the rail, whereby on positioning said hanger between said plate and abutment means, said trolley will be held against movement in either direction longitudinally of said rail.

5. The combination called for in claim 1 together with a second pair of projections on said suspending means detachably engageable with said hanger.

6. The combination with a trolley conveyor embodying a grooved wheel, an overhead rail on which said wheel is revolubly supported, a hanger mounted on said wheel and depending therefrom, an eye having a shank revolubly mounted on the lower end of said hanger, and a load engaging hook having a shank suspended from said eye; of a rigid elongate plate affixed to said rail having a major portion thereof projecting below said rail, a pair of projections fixed on said plate engageable with the shank of said eye in overlying relation to said eye, another pair of projections on said plate engageable with said hanger, and another pair of projections on said plate engageable with the shank of said hook.

7. The combination with a trolley conveyor embodying a grooved wheel, an overhead rail on which the wheel is revolubly supported, a hanger mounted on said wheel, and a load engaging hook having a shank loosely suspended from said hanger; of a rigid plate secured to said rail and depending therefrom at one side thereof substantially in a plane at right angles thereto, a pair of spaced parallel projections extending from said plate in laterally offset relation to said suspended shank and opening away from said hook and shank in a plane therewith in the direction of the length of said rail; said projections being spaced apart such distance as to freely receive said shank therebetween on advancing said trolley conveyor on said rail to position said hanger past said dependent plate followed by swinging said hanger laterally relative to said rail and plate to dispose said shank opposite the ends of said projections in position for engagement between said projections.

8. The combination called for in claim 7 together with an abutment on said rail for limiting movement of said trolley longitudinally of said rail in one direction arranged to be abutted by said hanger, said abutment projecting laterally from said rail on the side thereof opposite said plate, and arranged to cooperate with said plate when said shank is engaged by said projections to hold said trolley against movement longitudinally of said rail in either direction.

References Cited by the Examiner
UNITED STATES PATENTS

| | | | |
|---|---|---|---|
| 2,761,394 | 9/1956 | Cantrell et al. | 104—89 |
| 2,818,031 | 12/1957 | Peele et al. | 105—150 X |
| 3,124,081 | 3/1964 | Baker et al. | 104—89 |
| 3,138,114 | 6/1964 | Knippel | 104—89 |

ARTHUR L. LA POINT, *Primary Examiner.*

MILTON BUCHLER, *Examiner.*

F. W. MONAGHAN, *Assistant Examiner.*